US012157139B2

(12) United States Patent
Schäuble et al.

(10) Patent No.: US 12,157,139 B2
(45) Date of Patent: Dec. 3, 2024

(54) FLUID CONTAINER PRESS AND METHOD

(71) Applicant: FESTOOL GMBH, Wendlingen (DE)

(72) Inventors: Daniel Schäuble, Badenweiler (DE); Christoph Dieter, Gomaringen (DE)

(73) Assignee: Festool GmbH, Wendlingen (DE)

( * ) Notice: Subject to any disclaimer, the term of this patent is extended or adjusted under 35 U.S.C. 154(b) by 73 days.

(21) Appl. No.: 17/997,199

(22) PCT Filed: Feb. 11, 2021

(86) PCT No.: PCT/EP2021/053314
§ 371 (c)(1),
(2) Date: Oct. 26, 2022

(87) PCT Pub. No.: WO2021/219267
PCT Pub. Date: Nov. 4, 2021

(65) Prior Publication Data

US 2023/0219113 A1 Jul. 13, 2023

(30) Foreign Application Priority Data

Apr. 27, 2020 (DE) ..................... 10 2020 205 311.1

(51) Int. Cl.
*B05C 17/01* (2006.01)

(52) U.S. Cl.
CPC ................................ *B05C 17/0133* (2013.01)

(58) Field of Classification Search
CPC .......... B05C 17/0133; B05C 17/00596; B05C 17/0103
See application file for complete search history.

(56) References Cited

U.S. PATENT DOCUMENTS 2,480,017 A 8/1949 Green
4,583,934 A 4/1986 Hata et al.
(Continued)

FOREIGN PATENT DOCUMENTS

DE 31 29 237 2/1983
DE 34 18 052 12/1984
EP 1 272 281 6/2005

OTHER PUBLICATIONS

Examination Report issued in German Patent Application No. 10 2020 205 311.1, Nov. 18, 2020, 10 pages.
(Continued)

*Primary Examiner* — Donnell A Long
(74) *Attorney, Agent, or Firm* — HSML P.C.

(57) ABSTRACT

A fluid container press including a receptacle for a fluid container, a pressing device for pressing the fluid container and for locking the fluid container in the receptacle, a carrying handle, and a stabilizing handle with which the fluid container press can be gripped and stabilized with a second hand of the user while the user grips the carrying handle with his first hand. The fluid container press includes an actuating element operable by the user to release the locking of the fluid container in the receptacle so that the fluid container can be removed from the receptacle, in which the stabilizing handle is the actuating element or the actuating element is arranged in the region of the stabilizing handle so that the user can actuate the actuating element with his second hand while the user grips the stabilizing handle with his second hand.

17 Claims, 11 Drawing Sheets

(56) References Cited

U.S. PATENT DOCUMENTS

| | | | |
|---|---|---|---|
| 4,615,469 A | 10/1986 | Kishi et al. | |
| 4,986,454 A | 1/1991 | Riley | |
| 6,926,177 B1 * | 8/2005 | Scott | B05C 17/00516 222/326 |
| 2019/0091720 A1 | 3/2019 | Herman et al. | |

OTHER PUBLICATIONS

International Search Report issued in International Application No. PCT/EP2021/053314, May 25, 2021, 5 pages w/translation.

Written Opinion issued in International Application No. PCT/EP2021/053314, May 25, 2021, 6 pages.

Wolfcraft Deutschland GmbH: Wolfcraft Mechanische Kartuschenpresse (Sep. 17, 2015), https: //www.youtube.com/watch?v=nXS8mbTLxSM (accessed Oct. 25, 2022).

* cited by examiner

FLUID CONTAINER PRESS AND METHOD

The invention relates to a fluid container press, in particular a cartridge press and/or a tubular bag press, comprising a receptacle for a fluid container and a pressing device for pressing the fluid container to effect dispensing of fluid contained in the fluid container, the pressing device further serving to lock the fluid container in the receptacle so that the fluid container cannot be removed from the receptacle, further comprising a carrying handle by which the fluid container press can be carried and guided by a first hand of a user to position the fluid container press at a desired position during dispensing of the fluid, and a stabilizing handle by which the fluid container press can be gripped by a second hand of the user and stabilized during dispensing of the fluid while the user grips the carrying handle with his first hand.

SUMMARY OF THE INVENTION

One object of the invention is to provide a quick and easy unlocking of the fluid container.

The object is solved by a fluid container press according to claim 1. The fluid container press comprises an actuating element operable by the user to release the locking of the fluid container in the receptacle so that the fluid container can be removed from the receptacle, wherein the stabilizing handle is the actuating element or the actuating element is arranged in the region of the stabilizing handle so that the user can operate the actuating element with his second hand while the user grips the stabilizing handle with his second hand.

Thus, the user can actuate the actuating element, such as the stabilizing handle, while the user grips the fluid container press with both hands in the same manner in which the user operates the fluid container press in an intended manner to dispense the fluid from the fluid container and apply it to an application area. Thus, starting from an intended working process with the fluid container press, the user does not need to reach around to achieve unlocking of the fluid container. Consequently, quick and easy unlocking of the fluid container becomes possible.

BRIEF DESCRIPTION OF THE DRAWINGS

Further exemplary details as well as exemplary embodiments are explained below with reference to the figures. Thereby shows FIG. 1 a side view of a fluid container press according to a first embodiment, FIG. 2 a side view of a fluid container in which a pressing element is inserted, FIG. 3 a perspective view of the fluid container press without the fluid container inserted, FIG. 4 a perspective view of the fluid container press with the fluid container inserted, FIG. 5 a side view of a fluid container press according to a second embodiment, FIG. 6 a sectional view of an attachment, FIG. 7 a side view of a pressing device of the fluid container press, FIG. 8 a sectional view of a drive mechanism, FIG. 9 another sectional view of the drive mechanism, FIG. 10 a top view of a drive element, FIG. 11 a block diagram showing a resetting device according to a first variant, FIG. 12 a block diagram showing a resetting device according to a second variant, FIG. 13 a block diagram showing a resetting device according to a third variant, FIG. 14 a schematic side view of the fluid container press with a non-activated erecting mechanism, FIG. 15 a schematic side view of the fluid container press with an activated erecting mechanism, and FIG. 16 a flow chart of a method of operating the fluid container press.

DETAILED DESCRIPTION OF THE INVENTION

In the following explanations, reference is made to the spatial directions "x-direction", "y-direction" and "z-direction" which are orthogonal to each other. The x-direction and the y-direction are horizontal directions and the z-direction is a vertical direction (in a horizontal position of use of the fluid container press 10, 20).

Figure 1:
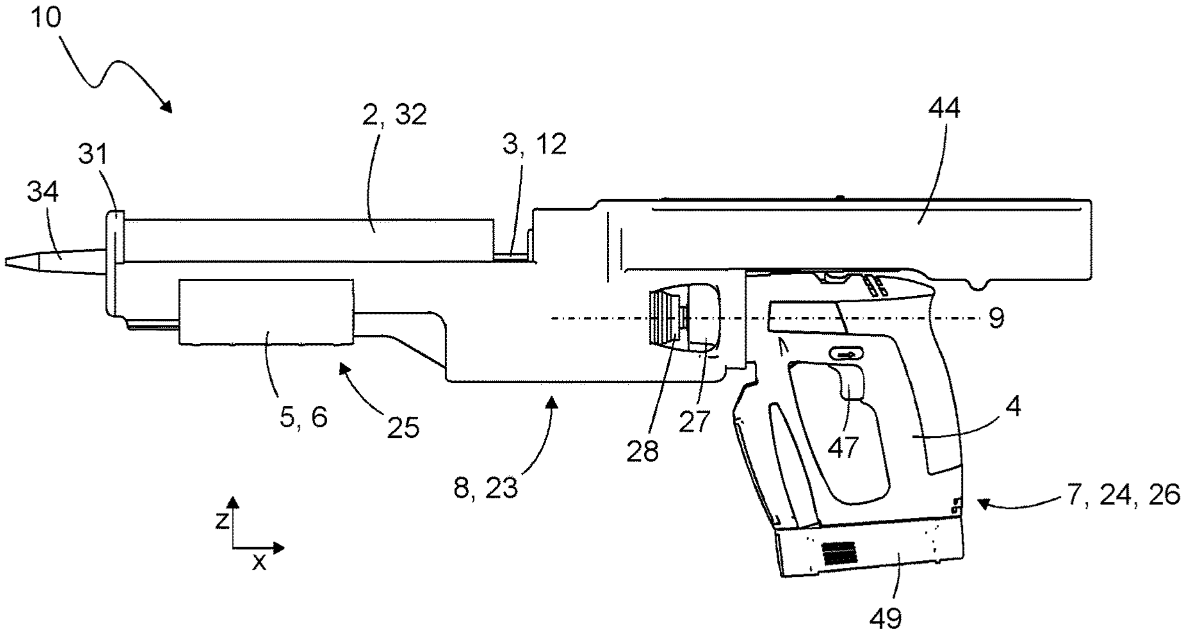
Figure 3:
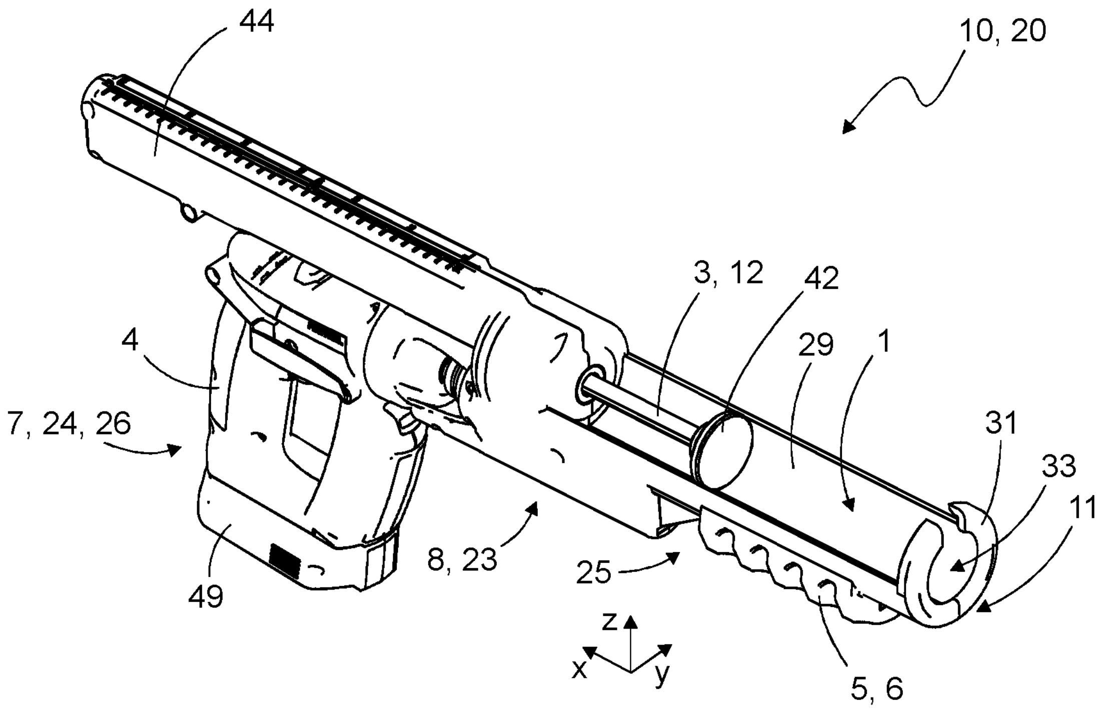
Figure 4:
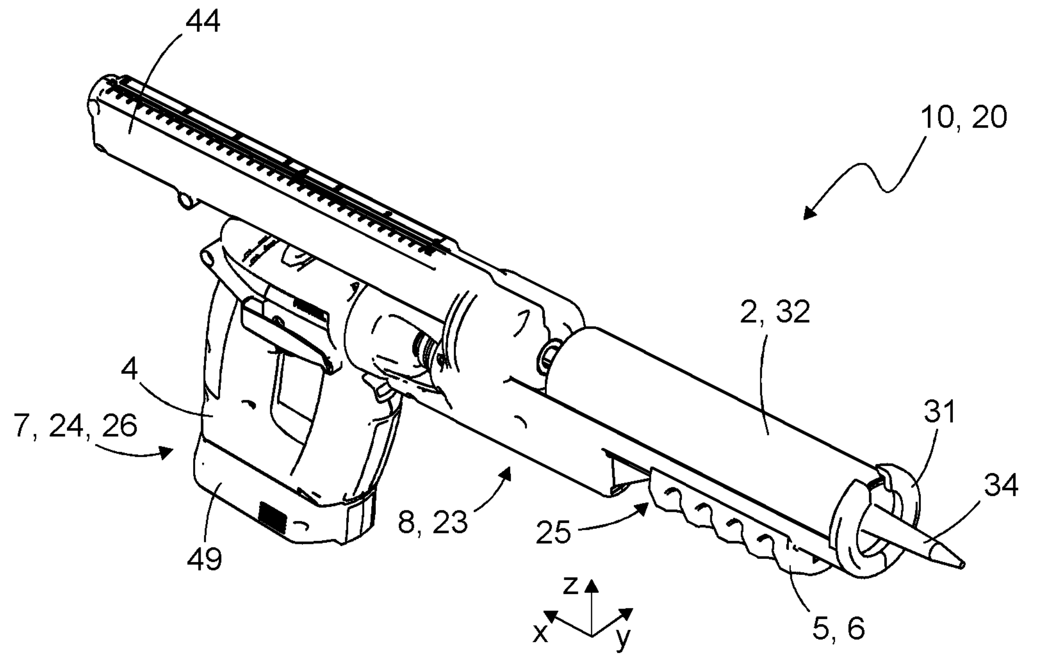

FIGS. 1, 3 and 4 show a fluid container press 10 according to a first embodiment. The fluid container press 10 is exemplarily designed as a cartridge press. Expediently, the fluid container press 10 may be designed as a tubular bag press.

The fluid container press 10 comprises a receptacle 1 (see FIG. 3) for a fluid container 2. The fluid container 2 is exemplarily designed as a cartridge. Expediently, the fluid container 2 may be designed as a tubular bag.

Figure 5:
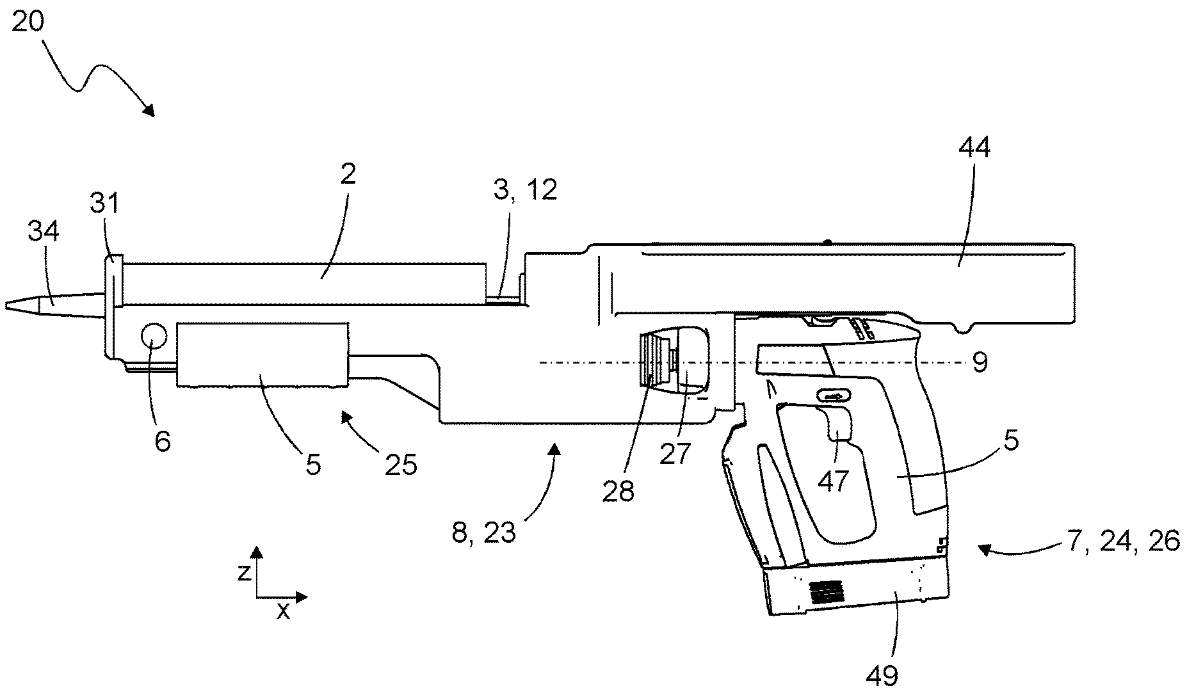

FIGS. 1 and 5 show the fluid container press 10 with a fluid container 2 inserted into the receptacle 1. Here, the fluid container press 10 comprises the fluid container 2. The fluid container press 10 can also be provided without the fluid container 2 inserted.

The fluid container press 10 includes a pressing device 3 for pressing the fluid container 2 to cause dispensing of fluid contained in the fluid container. The pressing device 3 further serves to lock the fluid container 2 in the receptacle 1 so that the fluid container 2 cannot be removed from the receptacle 1.

The fluid container press 10 includes a carrying handle 4. The carrying handle 4 allows the fluid container press 10 to be carried and guided by a first hand of a user to position the fluid container press 10 at a desired position when dispensing fluid.

The fluid container press 10 further comprises a stabilizing handle 5. The stabilizing handle 5 allows the fluid container press 10 to be gripped by a second hand of the user and stabilized during dispensing of the fluid, particularly while the user is gripping the carrying handle 4 with their first hand.

The fluid container press 10 further comprises an actuating element 6, the actuating element 6 being operable by the user to release the locking of the fluid container 2 in the receptacle 1 so that the fluid container 2 can be removed from the receptacle 1. In particular, when the actuating element 6 is actuated, the locking of the fluid container 2 in the receptacle 1 provided by the pressing device 3 is released.

Exemplarily, the stabilizing handle 5 is the actuating element 6. Thus, by actuating the stabilizing handle 5, the user can cause the locking of the fluid container 2 by the pressing device 3 in the receptacle 1 to be released. In particular, the user can actuate the stabilizing handle 5 with his second hand while the user grips the stabilizing handle 5 with his second hand (and grips the carrying handle 4 with his first hand).

FIG. 5 shows a fluid container press 20 according to a second embodiment. The fluid container press 20 is—with the exception of the differences explained below—expediently designed like the fluid container press 10, so that the explanations (above and below) relating to the fluid container press 10 in this respect also expediently apply to the fluid container press 20. In the fluid container press 20, the actuating element 6 may be arranged in the region of the stabilizing handle 5 so that the user may actuate the actuating element 6 with his second hand while the user grips the stabilizing handle 5 with his second hand (and grips the carrying handle 4 with his first hand). Expediently, in the fluid container press 20, the stabilizing handle 5 is not the actuating element 6.

Further exemplary details are to be explained below.

First of all, regarding the basic structure of the fluid container press 10, 20:

The basic shape of the fluid container press 10, 20 comprises a horizontal section 23 and a vertical section 24. The horizontal section 23 is elongated and oriented with its longitudinal axis parallel to the x-direction. The vertical section 24 is attached to the bottom of the horizontal section 23 and, starting from the horizontal section 23, extends downwards, in particular vertically downwards. Exemplarily, the basic shape of the fluid container press 10, 20 consists of the horizontal section 23 and the vertical section 24. Exemplarily, the fluid container press 10, 20 has a T-shaped basic shape.

The horizontal section 23 comprises the receptacle 1, the pressing device 3 and/or the stabilizing handle 5. The vertical section 24 comprises the carrying handle 4.

In an exemplary embodiment, the fluid container press 10, 20 comprises a shaft section 25. In an exemplary embodiment, the shaft section 25 is elongated and oriented with its longitudinal axis parallel to the x-direction. The shaft section 25 is part of the horizontal section 23; expediently, the shaft section 25 is the front longitudinal section of the horizontal section 23. The shaft section 25 comprises the receptacle 1, which is arranged in particular on the upper side of the shaft section 25. On the shaft section 25, in particular on the underside of the shaft section 25, the stabilizing handle 5 is expediently arranged.

Exemplarily, the fluid container press 10, 20 comprises a drive section 26. Exemplarily, the drive section 26 is provided by the vertical section 24. In particular, the drive section 26 is configured to provide the drive of the pressing device 3. The drive section 26 comprises an electric drive 16, in particular an electric motor, for driving the pressing device.

Exemplarily, the fluid container press 10, 20 comprises a screwing and/or drilling device 7. The screwing and/or drilling device 7 is expediently the drive section 26. The screwing and/or drilling device 7 is intended to refer in particular to a screwing and/or drilling power tool, for example a cordless screwdriver. The screwing and/or drilling device 7 is expediently detachable from the fluid container press 10, 20, and (in particular after attachment of a tool, for example a drill or a screwdriver blade) usable for screwing and/or drilling. In particular, a device to which no tool, in particular no drill or screwdriver blade, has yet been attached, shall also be referred to as screwing and/or drilling device. The screwing and/or drilling device 7 comprises the carrying handle 4. The screwing and/or drilling device 7 can also be referred to as a drive device.

The fluid container press 10, 20 comprises an attachment device 8. The attachment device 8 expediently comprises the shaft section 25. Exemplarily, the attachment device 8 is the horizontal section 23. The attachment device 8 is attached, in particular detachably attached, to the drive section 26, in particular the screwing and/or drilling device 7. The attachment device 8 comprises the stabilizing handle 5. The attachment device 8 is expediently configured as a cartridge press attachment device. The attachment device 8 can also be designed as a tubular bag press attachment device.

The drive section 26, in particular the screwing and/or drilling device 7, comprises a drive interface 27 for providing a drive rotary motion, which is generated in particular by means of the electric drive 16. The attachment device 8 comprises an receiving interface 28 for receiving the drive rotary motion provided at the drive interface 27. The attachment device 8 is connected with the receiving interface 28 to the drive interface 27 of the drive section 26.

Preferably, the attachment device 8 is rotatable relative to the screwing and/or drilling device 7 about an axis of rotation 9 aligned parallel to the longitudinal direction of the fluid container press 10, 20. Exemplarily, the fluid container press 10, 20 comprises a pivot bearing by means of which the attachment device 8 is mounted on the screwing and/or drilling device 7, so as to be rotatable about the axis of rotation 9. It is expedient that the attachment device 8 can be rotated by means of the pivot bearing in an angular range of at least 100 degrees, in particular at least 140 degrees, relative to the screwing and/or drilling device 7.

The receptacle 1 is designed to receive the fluid container 2. The receptacle bottom 29 of the receptacle 1 is shaped in particular to correspond to the shape of the fluid container 2. Exemplarily, the fluid container 2 has a cylindrical, in particular circular-cylindrical, shape. The receptacle bottom 29 defines a cylinder segment-shaped receptacle recess which corresponds to the cylindrical shape of the fluid container 2 and into which the cylindrical fluid container 2 can be inserted. In particular, the receptacle recess is groove-shaped. Exemplarily, the receptacle 1 is designed as a half-shell, in particular as a half-shell open towards the top. The receptacle 1 can also be referred to as an open receptacle 1.

The receptacle 1 comprises a front stop structure 31, which is arranged in particular at the front end 11 of the receptacle 1. The front end 11 of the receptacle is the end of the horizontal section 23 facing away from the drive section 26 in the (negative) x-direction.

In particular, the front end 11 is located at the front end face of the shaft section 25. Expediently, the dispensing of the fluid from the fluid container 2 takes place at the front end 11. The stop structure 31 serves to support the fluid container 2 and, in particular, to support the fluid container 2 in the (negative) x-direction and/or in the radial direction. The stop structure 31 is exemplarily ring-shaped or ring segment-shaped, with the ring axis expediently aligned parallel to the x-direction. The stop structure 31 expediently has a recess into which the fluid container 2 can be inserted with the end face of its cylindrical container body 32. The recess is in particular ring-shaped or ring segment-shaped. The stop structure 31 further comprises a central aperture 33 through which a dispensing element 34, in particular a dispensing nozzle, of the fluid container 2 projects when the fluid container 2 is inserted into the receptacle 1. The stop structure 31 expediently occupies less than 10% of the x-extension of the receptacle 1.

Exemplarily, the receptacle 1 (except for the stop structure 31 located at the front end 11) is open upwards (i.e. in the z-direction) and to the sides (i.e. in the positive and/or negative y-direction), in particular completely open. Preferably, the receptacle 1 is bounded only by the receptacle bottom 29, i.e. in particular only downwardly, in an x-region starting from the stop structure 31 in the positive x-direction and extending to the rear end (in the positive x-direction) of the receptacle 1, and is otherwise expediently not bounded, in particular not upwardly and/or toward the sides. Expediently, the receptacle 1 is completely open in this entire x-range extending from the stop structure 31 in an angular range of at least 140 degrees or at least 180 degrees about the longitudinal axis of the receptacle 1. The x extension of the receptacle 1 is expediently at least 20% or at least 30% of the x extension of the fluid container press 10, 20.

Figure 2:
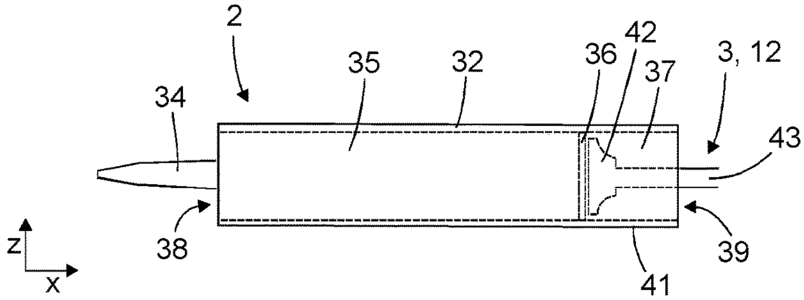

FIG. 2 shows an exemplary embodiment of the fluid container 2. The fluid container 2 comprises a container body 32, which is shaped in particular cylindrically, preferably circular-cylindrically. Exemplarily, the container body 32 is hollow cylindrical in shape. The longitudinal axis of the container body 32 is aligned parallel to the x-direction. The container body 32 has a front end face 38 and a rear end face 39, each of which is expediently oriented perpendicular to the x-direction. The rear end face 39 is expediently configured to be open in the x-direction, so that a receiving space 37 (for receiving an pressing element 12) is accessible via the rear end face 39. The receiving space 37 is bounded in the radial direction by a rear hollow cylindrical body section 41 of the container body 32. Furthermore, the receiving space 37 is bounded in the negative x-direction by an in particular disc-shaped pressing section 36. In the positive x-direction, the receiving space 37 is open. The receiving space 37 is in particular cylindrical.

The fluid container 2 is preferably designed as a cartridge, in particular as a joint sealant cartridge, for example as a silicone cartridge or acrylic cartridge. The fluid container 2 comprises a fluid chamber 35 arranged in the container body 32, in which the fluid to be dispensed is located. In particular, the fluid is joint sealant, for example silicone or acrylic.

The fluid container 2 comprises a dispensing element 34, which is designed in particular as a dispensing nozzle and is expediently aligned with its longitudinal axis parallel to the x-direction. The dispensing element 34 is arranged at the front end face 38. The fluid container 2 further comprises the pressing section 36 which, when pushed, reduces the fluid chamber 35 so that the fluid is discharged from the fluid container 2 through the dispensing element 34. The pressing section 36 is disposed at the rear end face 39 and/or is accessible through the rear end face 39.

In particular, the pressing section 36 is movable in the (negative) x-direction to cause the fluid to be dispensed. The negative x-direction shall also be referred to as the forward direction, and the positive x-direction shall be referred to as the reverse direction. Exemplarily, the pressing section 36 is disc-shaped. The pressing section 36 is inserted into the hollow cylindrical container body 32 and is movable in the x-direction relative to the hollow cylindrical container body 32 to reduce the fluid chamber 35. The pressing section 36 may also be referred to as a piston member or a bottom, particularly a cartridge bottom. On the side of the pressing section 36 facing away from the fluid chamber 35, there is the receiving space 37 for receiving the pressing element 12 of the pressing device 3.

The pressing device 3 comprises a pressing element 12, by means of which the pressing section 36 can be pressed (in the negative x-direction) to cause the fluid to be discharged from the fluid chamber 35. The pressing element 12 further serves to support the fluid container 2 (inserted into the receptacle 1 and applied against the front stop structure 31) in the (positive) x-direction and/or radial direction (in particular z-direction and/or y-direction), and to lock the fluid container 2 in the receptacle 1 in this way; that is, in particular, to fix it in the receptacle 1 in such a way that the fluid container 2 cannot be removed from the receptacle 1.

The pressing element 12 comprises, by way of example, a pressing head 42 which can be inserted into the receiving space 37 and/or can be placed directly against the pressing section 36. The pressing head 42 is exemplarily designed as a press plunger and has in particular a disk-shaped end section. In the (positive) x-direction, a rod section 43 adjoins the pressing head 42. The rod section 43 is designed in particular as a spindle 18 and expediently has a thread, in particular an external thread. The rod section 43 is aligned with its longitudinal axis parallel to the x-direction.

The horizontal section 23 of the fluid container press 10, 20 may also be referred to as the press section. The horizontal section 23 comprises the shaft section 25 already explained above. The horizontal section 23 further comprises a rear longitudinal section 44 adjoining the shaft section in (positive) x-direction. Exemplarily, the rear longitudinal section 44 extends in (positive) x-direction behind the drive section 26, in particular behind the carrying handle 4. The rear longitudinal section 44 serves in particular to receive the rod section 43 of the pressing element 12.

The pressing device 3 further comprises a drive mechanism 51 for driving the pressing element 12. The drive mechanism 51 serves to drive the pressing element 12 in the forward direction, thereby causing the fluid to be discharged from the fluid container 2. In particular, the drive mechanism 51 is configured to convert the rotational drive motion provided by the drive section 26, in particular the electric drive 16, into a linear motion of the pressing element 12. The linear movement is in particular a forward movement, expediently in the (negative) x-direction.

FIGS. 6 to 9 show an exemplary embodiment of the drive mechanism 51. The drive mechanism includes a drive element 17, which is coupled to the pressing element 12 and which is used to drive the pressing element 12. The drive element 17 is capable of being set into an output rotary motion based on the input rotary motion (provided by the drive section 26), and is configured to set the pressing element 12 into the linear motion based on the output rotary motion. Exemplarily, the drive element 17 has teeth on its outer periphery. Furthermore, the drive element 17 has a central aperture on which an internal thread is provided. The drive element 17 may also be referred to as a spindle nut 19, a gear wheel, or a spindle nut gear wheel. The spindle 18 of the pressing element 12 extends through the central aperture. The spindle 18 has its external thread in engagement with the internal thread of the drive element 17, so that the spindle 18 is set in linear motion when the drive element 17 rotates.

The drive mechanism 51 further comprises a coupling gear 45 through which the drive element 17 is coupled to the drive section 26. The coupling gear 45 is in mesh with the teeth of the drive element 17. Exemplarily, the coupling gear 45 has a smaller diameter than the drive element 17. Exemplarily, the coupling gear 45 is arranged below the drive element 17 in the z-direction. The coupling gear 45 is non-rotatably coupled to an output shaft 46 of the receiving interface 28. Exemplarily, the coupling gear 45 is arranged coaxially with the output shaft 46. The output shaft 46 is oriented parallel to the x-direction. The output shaft 46 is coupled to the drive section 26, in particular via the receiving interface 28 to the drive interface 27, and is set into the output rotary motion by the input rotary motion provided by the drive section 26. The output rotary motion is transmitted to the drive element 17 via the coupling gear 45.

The fluid container press 10, 20 comprises an operating element 47, by means of which the drive of the pressing element 12 is controllable—and thereby the dispensing of the fluid from the fluid container 2. The operating element 47 is designed in particular as a button, expediently as a trigger button or pistol trigger. The operating element 47 is arranged on the carrying handle 4, in particular at the upper end of the carrying handle 4. The operating element 47 is operable with the first hand of the user, in a state in which the user grips the carrying handle 4 with the first hand. The operating element 47 is communicatively coupled to the electric drive 16, for example via a control unit 48, such that actuation of the operating element 47 causes the pressing element 12 to be driven by the electric drive 16.

The fluid container press 10, 20 is designed to move the pressing element 12 selectively into a locking position and a release position. In the locking position, the pressing element 12 is located further in the (negative) x-direction than in the release position. In particular, in the locking position, the pressing element 12 is located in the x-region of the receptacle 1 and/or in the receiving space 37 of the fluid container 2. In the release position, the pressing element 12 is expediently not located in the x-region of the receptacle 1 and/or not in the receiving space 37.

The fluid container press 10, 20 has the drive mechanism 51 to move the pressing element 12 to the locked position. In order to move the pressing element 12 into the locking position, the pressing element 12 is moved in the forward direction (i.e. negative x-direction). Further, the fluid container press 10, 20 has a resetting device 14 for moving the pressing element 12 to the release position. To move the pressing element 12 into the release position, the pressing element 12 is moved in the backward direction (i.e., positive x-direction).

Figure 11:
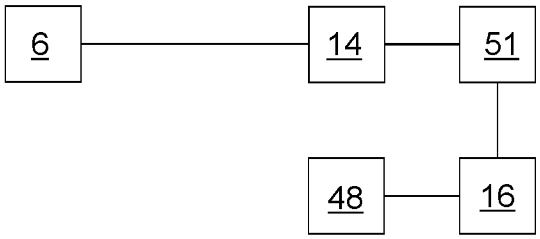
Figure 12:
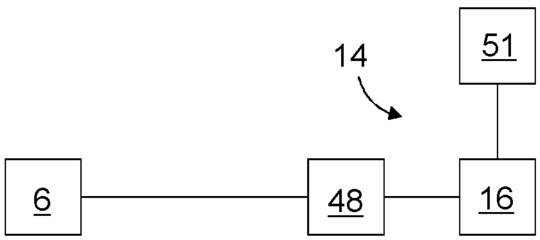
Figure 13:
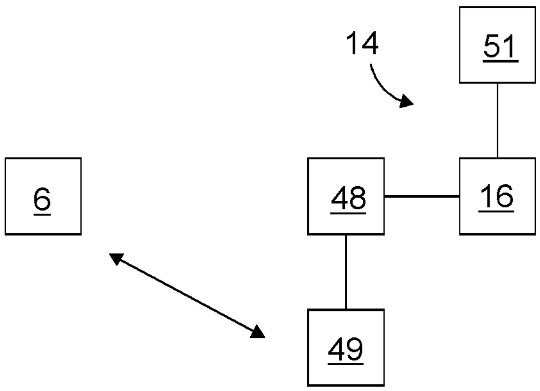

The resetting device 14 can be triggered by actuating the actuating element 6. FIGS. 11 to 13 show various ways in which the resetting device 14 is coupled to the actuating element 6 and/or how the resetting device 14 can be designed.

FIG. 11 shows a first embodiment in which the resetting device 14 is coupled to the actuating element 6. Preferably, the resetting device 14 is mechanically coupled to the actuating element 6 so that the resetting device 14 is mechanically triggered by the actuating element 6. The resetting device 14 may also be referred to as a resetting mechanism. Alternatively, the actuating element 6 and the resetting device 14 may be communicatively coupled. For example, the actuating element 6 is configured to transmit a control signal and the resetting device 14 is configured to receive the control signal and trigger based on the control signal to cause the pressing element 12 to be moved to the release position.

Exemplarily, the resetting device 14 (when triggered) causes the coupling between the drive element 17 and the pressing element 12 to be released and the pressing element 12 to be moved into the release position, in particular by means of a spring element 15.

Here, the resetting device 14 acts (in particular mechanically) on the drive mechanism 51 to release the coupling between the drive element 17 and the pressing element 12.

FIG. 11 further shows the electric drive 16 and a control unit 48 that is part of the fluid container press 10, 20 and in particular is arranged at the drive section 26. The control unit 48 controls the electric drive 16 so that the electric drive 16 drives the drive mechanism 51, thereby causing the forward movement of the pressing element 12. In the embodiment shown in FIG. 1, the resetting device 14 is expediently independent of the control unit 48 and/or the electric drive 16. In order to move the pressing element 12 into the release position, the control unit 48 and/or the electric drive 16 are preferably not required.

FIG. 12 shows a second embodiment in which the resetting device 14 is communicatively connected to the actuating element 6. The resetting device 14 is formed here by the electric drive 16, the drive mechanism 51 and the control unit 48. The actuating element 6 is connected to the control unit 48 in a wired or wireless manner and, when the actuating element 6 is actuated, causes (by sending a control signal) the control unit 48 to control the electric drive 16 in such a way that the electric drive 16 drives the drive mechanism 51 in such a way that the pressing element 12 is moved into the release position by the drive mechanism 51. Thus, the resetting device 14 here comprises the electric drive 16, which is configured to move the pressing element 12 into the release position.

FIG. 13 shows a third embodiment, which corresponds to the second embodiment in that the pressing element 12 is moved to the release position by the electric drive 16. In the third embodiment, a battery section 49, for example an exchangeable battery module, of the drive section 26 is configured as a communication device and is configured to provide wireless communication, for example Bluetooth communication, to the actuating element 6. When the actuating element 6 is actuated, wireless communication (of a control signal) is provided from the actuating element 6 to the battery section 49, which in response communicates with the control unit 48 to cause (by means of a control command) the pressing element 12 to be moved to the release position via the electric drive 16 and the drive mechanism 51.

Expediently, the drive section 26, in particular the electric drive 16, provides the input rotary motion in a first rotational direction to move the pressing element 12 in the forward direction. Further, the drive section 26, in particular the electric drive 16, provides the input rotary motion in a second rotational direction opposite to the first rotational direction to move the pressing element 12 in the reverse direction.

The carrying handle 4 and the stabilizing handle 5 are described in more detail below. The carrying handle 4 and the stabilizing handle 5 are two different handles. The stabilizing handle 5 is provided in addition to the carrying handle 4. The stabilizing handle 5 is spaced apart from the carrying handle 4. The stabilizing handle 5 is not the carrying handle 4.

The carrying handle 4 is exemplarily part of the vertical section 24, in particular of the drive section 26. The carrying handle 4 is exemplarily designed as a pistol grip. The longitudinal axis of the carrying handle 4 is oriented vertically, in particular in the z-direction or in the x-z-direction. The carrying handle 4 is grippable about its longitudinal axis. The carrying handle 4 is arranged in the rear region of the fluid container press 10, 20. The carrying handle 4 is preferably at least 8 cm long (in the direction of its longitudinal axis).

Exemplarily, the stabilizing handle 5 is arranged further forward (i.e. further in the negative x-direction) than the carrying handle 4. Exemplarily, the stabilizing handle 5 is arranged in the longitudinal direction of the fluid container press 10, 20 (i.e. in the x-direction) between the carrying handle 4 and the front end 11 of the receptacle 1, in particular the front end of the fluid container press 10, 20. The stabilizing handle 5 is arranged in particular in the front area of the fluid container press 10, 20.

Exemplarily, the stabilizing handle 5 is arranged in the longitudinal direction of the fluid container press 10, 20 (i.e., in the x-direction) in the same longitudinal region as the receptacle 1. In particular, the stabilizing handle 5 occupies the same x-range as the receptacle 1 and/or the fluid container 2. Preferably, the stabilizing handle 5 is exclusively located in the same x-range as the receptacle 1 and/or the fluid container 2.

The stabilizing handle 5 is arranged on the horizontal section 23, in particular the shaft section 25. Exemplarily, the stabilizing handle 5 is arranged at the bottom of the shaft section 25. The stabilizing handle 5 at least partially surrounds the shaft section 25. Exemplarily, the stabilizing handle 5 is designed as a fore-end handle. Expediently, the stabilizing handle 5 is elongated and oriented with its longitudinal axis parallel to x-direction. The stabilizing handle 5 can be gripped around its longitudinal axis. In an exemplary embodiment, the stabilizing handle 5 has the basic shape of a hollow cylinder segment; that is, in particular, a hollow cylinder in which a partial circumference is omitted. The stabilizing handle 5 is expediently at least 8 cm long (in the x-direction).

Preferably, the stabilizing handle 5 represents the actuating element 6. Exemplarily, the stabilizing handle 5 is displaceable in the longitudinal direction of the fluid container press 10 (i.e. in the x-direction) for actuation. In particular, the stabilizing handle 5 is mounted on the shaft section 25 for linear movement. The fluid container press 10 includes a linear bearing that provides the linear-movement mounting of the stabilizing handle 5 on the shaft section 25.

The stabilizing handle 5 can be moved selectively to an actuated position or a non-actuated position by user actuation. In the actuated position, the stabilizing handle 5 is expediently located further in the positive x-direction than in the non-actuated position. In particular, the stabilizing handle 5 is located closer to the carrying handle 4 in the actuated position than in the non-actuated position. To move the stabilizing handle 5 to the actuated position, the stabilizing handle 5 is pulled backward—that is, in the backward direction—with the second hand of the user, in particular while the user grips the carrying handle 4 with the first hand. Exemplarily, the stabilizing handle 5 is biased, particularly in the negative x-direction, so that the stabilizing handle 5 pushes into the non-actuated position by itself (for example, when the user releases the stabilizing handle 5). In response to the actuated position of the stabilizing handle 5, the resetting device 14 causes the pressing element 12 to be moved into the release position.

Preferably, in response to the non-actuated position of the stabilizing handle 5, the drive element 17 is coupled to the pressing element 12 so that the pressing element 12 is drivable via the drive element 17 to perform the forward movement.

As mentioned above, in the second embodiment (see FIG. 5), the actuating element 6 may be arranged in the area of the stabilizing handle 5. In this case, the stabilizing handle 5 is preferably not the actuating element 6. As shown in FIG. 5, the actuating element 6 can be arranged next to the stabilizing handle 5, for example. The actuating element 6 is arranged close enough to the stabilizing handle 5 so that it can be actuated by the user's second hand while the user grips the stabilizing handle 5 with his second hand. The actuating element 6 is exemplarily designed as a button. According to a possible embodiment, the actuating element 6 (in particular designed as a button) can be arranged on the stabilizing handle 5. In this case, too, the actuating element 6 is arranged in the region of the stabilizing handle 5.

In the following, an exemplary mechanical embodiment of the resetting device 14 will be discussed in more detail with reference to FIGS. 6 to 10.

As mentioned above, the pressing device 3 comprises the pressing element 12 for pressing and for locking the fluid container 2. The resetting device 14 is designed to automatically move, in response to the actuation of the actuating element 6, the pressing element 12 into the release position in which the locking of the fluid container 2 is released. In particular, the resetting device 14 is designed to provide the resetting force required to move the pressing element 12 into the release position. Thus, the resetting force does not have to be provided by user. In particular, the user does not have to manually move the pressing element 12 into the release position.

Figure 6:
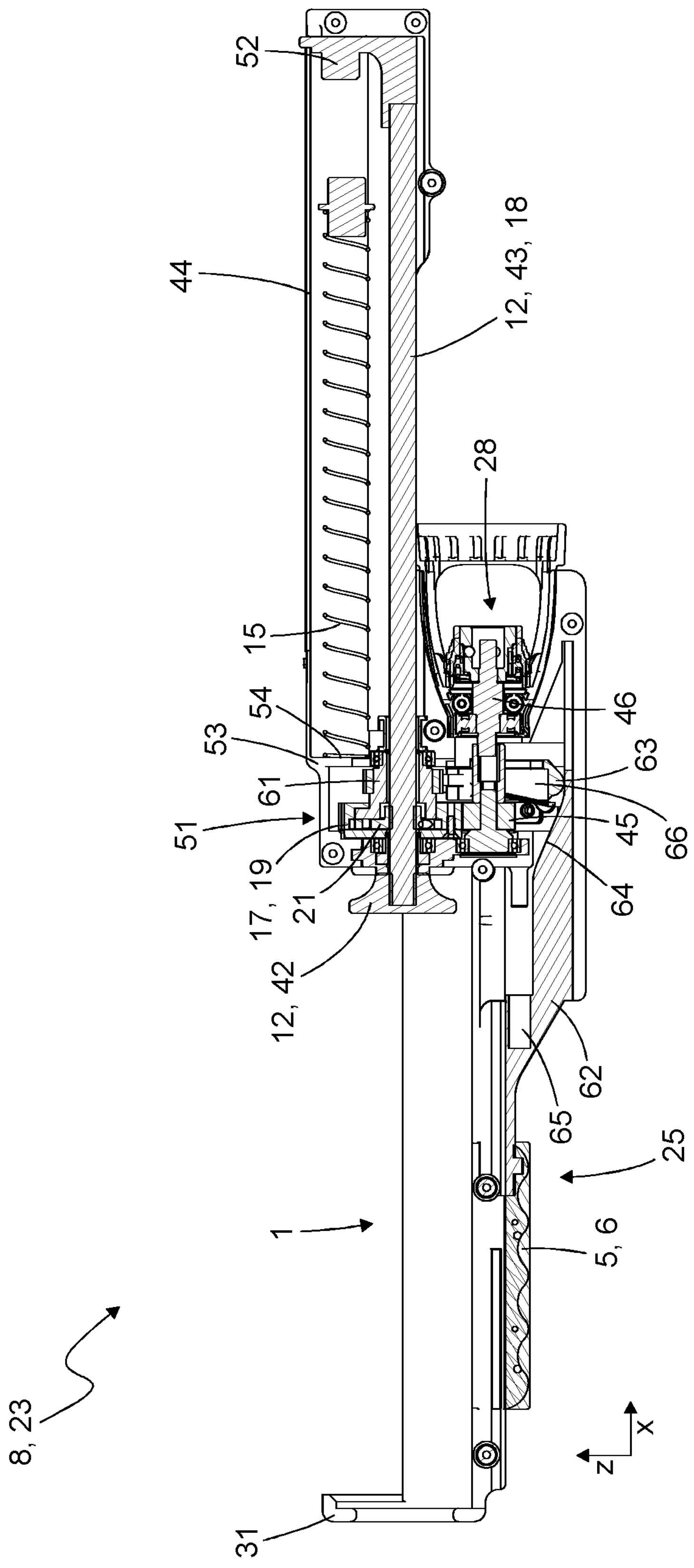
Figure 7:
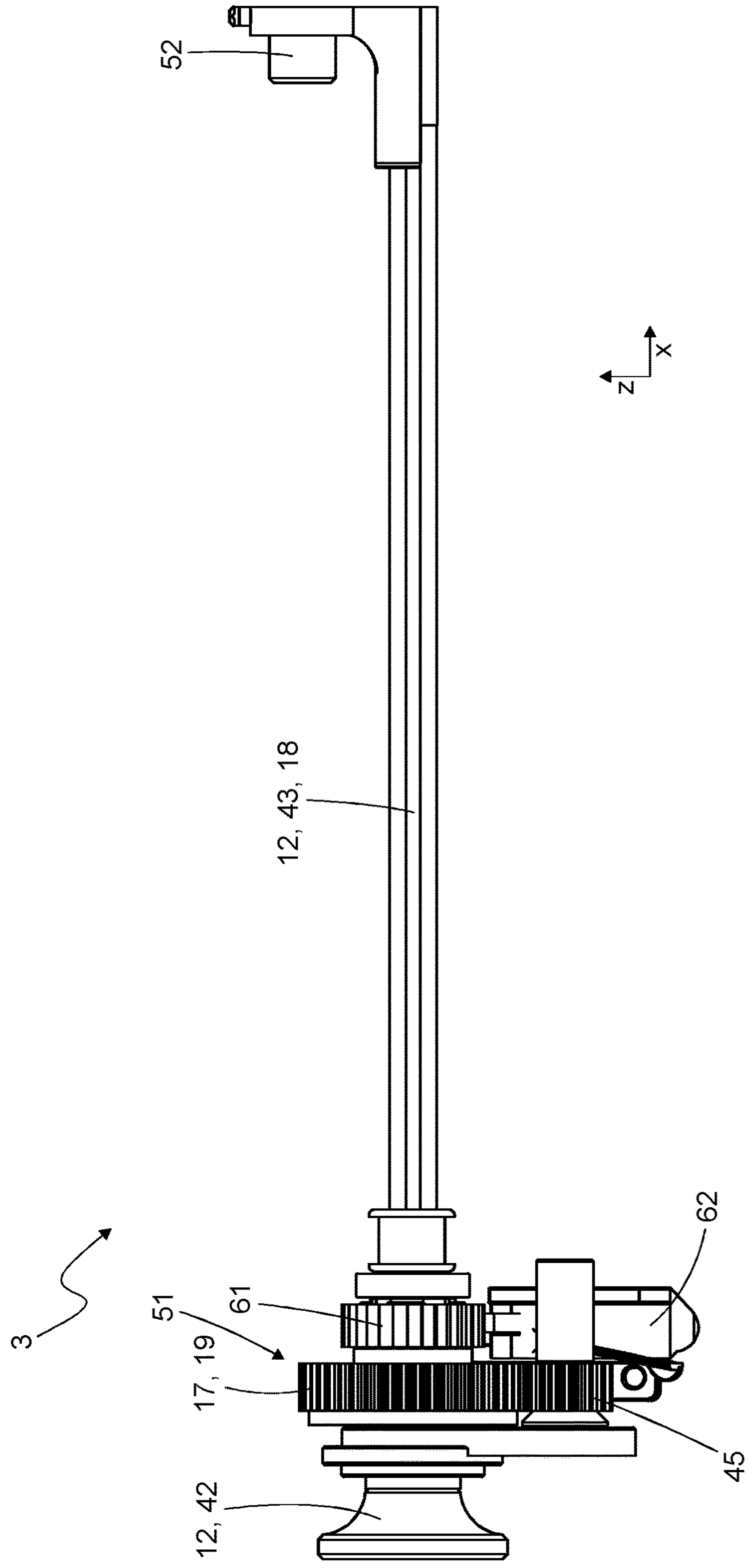
Figure 8:
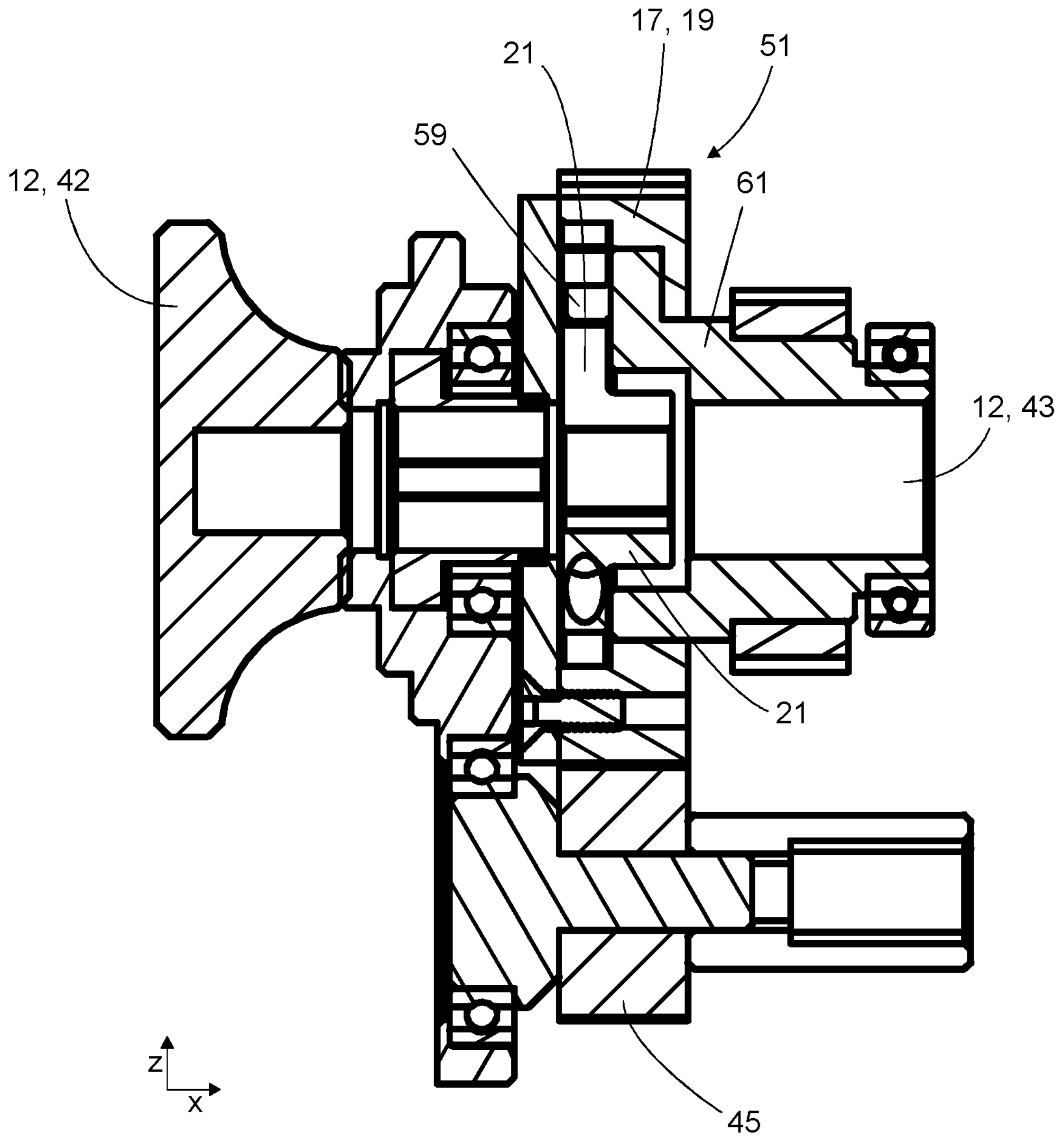
Figure 9:
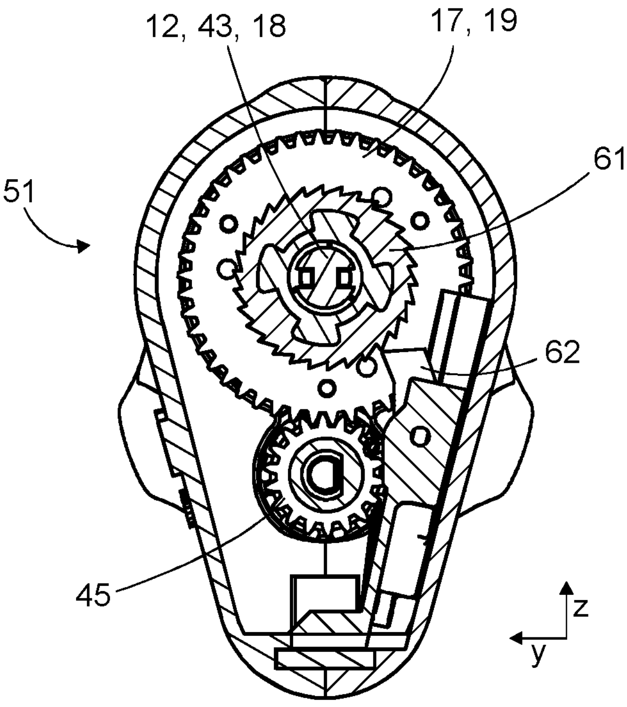

As shown in FIG. 6, the resetting device 14 comprises, by way of example, the spring element 15, the spring force of which serves to displace the pressing element 12 into the release position. The spring force of the spring element 15 serves as the resetting force required to displace the pressing element 12 into the release position. Exemplarily, the spring element 15 is a spiral spring. In particular, the spring element 15 is designed as a compression spring. The spring element 15 is aligned with its longitudinal axis parallel to the x-direction. Exemplarily, the spring element 15 is arranged parallel to the rod section 43, in particular vertically above the rod section 43. In particular, the spring element 15 is arranged in the rear longitudinal section 44 of the horizontal section 23.

Exemplarily, the pressing element 12 has a spring support element 52 on which the spring element 15 is supported (in particular when the pressing element 12 is in the locked position). The spring support element 52 is arranged, by way of example, on the rod section 43, in particular at its rear end (i.e. furthest rearward in the positive x-direction). The spring support element 52 extends radially from the rod section 43, in particular vertically upwards. The rod section 43 is in particular the spindle 18.

The fluid container press 10, 20, in particular the horizontal section 23, has a support structure 53 relative to which the pressing element 12 is movable. Exemplarily, the support structure 53 represents the housing of the horizontal section 23. The support structure 53 comprises a support section 54 on which the spring element 15 is supported. Exemplarily, the spring element 15 is arranged between the support element 52 and the support section 54. When the pressing element 12 moves in the forward direction (i.e., in the negative x direction), the support element 52 moves with the pressing element 12 toward the support section 54 so that the spring element 15 is compressed between the support section 54 and the support element 52. When (by triggering the resetting device 14) the pressing element 12 is decoupled from the drive element 17, the spring force acting on the support element 52 causes the pressing element 12 to move in the reverse direction (i.e., in the positive x-direction) to the release position.

As noted above, the fluid container press 10, 20 includes the drive element 17 coupled to the pressing element 12 for driving the pressing element 12. The resetting device 14 is configured to disengage the coupling between the drive element 17 and the pressing element 12 in response to actuation of the actuating element 6.

Figure 10:
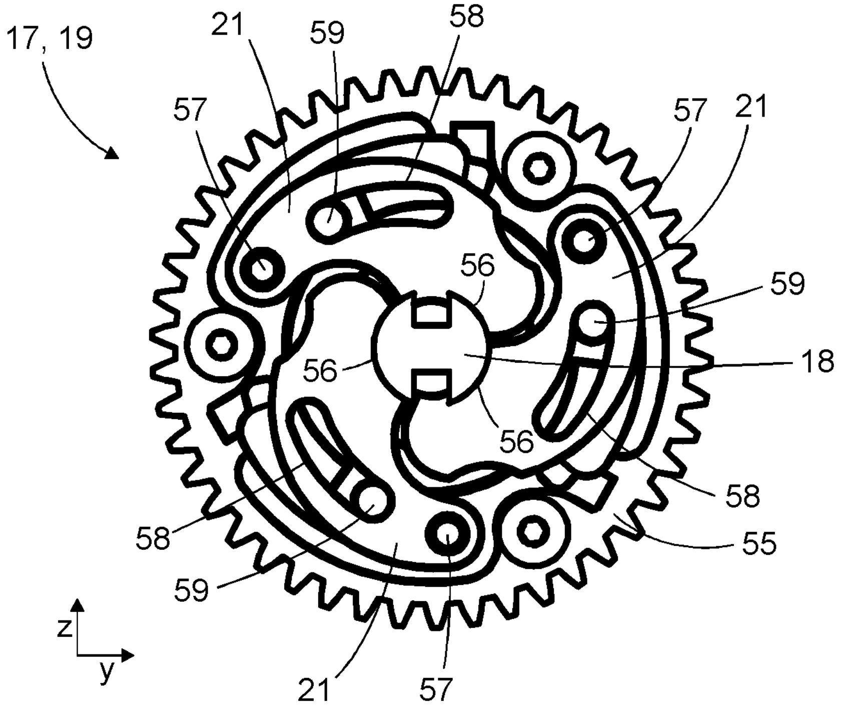

The drive element 17 is shown, for example, in FIG. 10. As mentioned above, the drive element 17 is exemplarily designed as a spindle nut 19. Exemplarily, the spindle nut 19 comprises at least one coupling element 21. In response to actuation of the actuating element 6, the at least one coupling element 21 is displaceable from a coupling position, in which the coupling element 21 is in engagement with the external thread of the spindle 18, to a decoupling position, in which the coupling element 21 is not in engagement with the external thread of the spindle 18.

FIG. 10 shows an exemplary embodiment in which the spindle nut 19 comprises several coupling elements 21—here exemplarily three coupling elements 21. Each coupling element 21 is exemplarily designed as a jaw. The spindle nut 19 has a gear wheel body 55 on which each coupling element 21 is arranged. Each coupling element 21 is attached to the gear wheel body 55 in such a way that each coupling element 21 rotates with the spindle nut 19 when the latter is set into a rotational movement for driving the pressing element 12.

Each coupling element 21 has an internal thread portion 56. The internal thread portions 56 together form the internal thread of the spindle nut 19. Each internal thread portion 56 engages the external thread of the spindle 18 in the coupling position. Further, each internal thread portion 56 does not engage the external thread of the spindle 18 in the decoupling position.

Each coupling element 21 is mounted on the gear wheel body 55 so as to be pivotable about a respective pivot axis 57. By pivoting about the respective pivot axis 57, each coupling element 21 can be moved selectively into the coupling position or the decoupling position.

Each coupling element 21 has a guide section 58, which is exemplarily designed as a guide slot. Each guide section 58 is engaged by a respective engagement element 59, which is expediently designed as a bolt. By moving the respective engagement element 59, the pivoting of each coupling element 21 is achieved. Expediently, the engagement elements 59 are part of a decoupling element 61. The decoupling element 61 is designed as a gear wheel and may also be referred to as a decoupling gear wheel. Exemplarily, the decoupling element 61 is arranged coaxially to the spindle nut 19. Exemplarily, the decoupling element 61 is arranged directly adjacent to the spindle nut 19 in the x-direction. The decoupling element 61 has an opening, for example a central bore, through which the spindle 18 passes.

The decoupling element 61 is capable of being set in an unlocking rotational motion relative to the spindle nut 19 to set the engagement elements 59 in motion so that the coupling elements 21 are pivoted to the decoupling position.

Exemplarily, each coupling element 21 is spring biased so that each coupling element 21 urges by itself into the coupling position.

The actuating element 6 is coupled to the coupling elements 21 such that a displacement of the actuating element 6 into the actuated position causes the coupling elements 21 to be displaced into the decoupled position. Furthermore, a displacement of the actuating element 6 into the non-actuated position causes the coupling elements 21 to be displaced into the coupling position.

Exemplarily, the actuating element 6 is mechanically coupled to the decoupling element 61 via a coupling arrangement in such a way that a movement, in particular a linear movement, of the actuating element 6 into the actuated position is mechanically converted into a rotational movement of the decoupling element 61 relative to the spindle nut 19, so that the coupling elements 21 are moved into the decoupling position.

According to an alternative embodiment, the actuating element 6 is not mechanically coupled to the resetting device 14 but communicatively. For example, the actuation of the actuating element 6 is converted by an electrical switch and/or sensing device into an electrical signal via which an actuator on the spindle nut 19 and/or the spindle 18 is controlled, in particular in order to effect the decoupling between the spindle nut 19 and the spindle 18.

The coupling arrangement exemplarily comprises a first coupling section 62 and a second coupling section 63. The first coupling section 62 is attached to the stabilizing handle 5, in particular in the x-direction. The first coupling section 62 moves with the stabilizing handle 5 during a linear movement of the stabilizing handle 5 in the x-direction. The first coupling section 62 has an inclined surface 64 against which the second coupling section 63 abuts. In an exemplary embodiment, the inclined surface 64 is oriented perpendicular to an x-z direction. By abutting against the inclined surface 64, the second coupling section 63 is caused to move upward with a z-component, particularly a vertical movement, when the first coupling section 62 moves backward (in a positive x-direction). The second coupling section 63 is engaged with the teeth of the decoupling element 61, so that the movement of the second coupling section 63 is converted into a rotational movement of the decoupling element 61, which causes the coupling elements 21 to be moved to the decoupling position. The second coupling section 63 is designed in particular as a pawl.

Expediently, the fluid container press 10, 20 has an actuating element return spring 65 that urges the actuating element 6, in particular the stabilizing handle 5, to the non-actuated position. In an exemplary embodiment, the actuating element return spring 65 acts on the first coupling section 62, in the forward direction, that is, in the negative x-direction.

Preferably, the fluid container press 10 further comprises a coupling section return spring 66 acting on the second coupling section 63 and expediently urging the second coupling section 63 in a downward direction. In particular, the coupling section return spring 66 urges the second coupling section 63 to a coupling section release position in which the second coupling section 63 is not engaged with the decoupling element 61.

When the user no longer actuates the stabilizing handle 5 with his second hand, in particular no longer applies a force in the negative x direction to the stabilizing handle 5, the stabilizing handle 5 is moved from the actuated position to the non-actuated position by the actuating element return spring 65. When the stabilizing handle 5 is in the non-actuated position, the inclined surface 64 no longer pushes the second coupling section 63 upward, so the second coupling section 63 is moved downward to the coupling section release position by the coupling section return spring 66. The second coupling section 63 does not exert a force on the decoupling element 61 in the coupling section release position, so that the coupling elements 21 are moved to the coupling position due to their spring bias.

Optionally, in a state in which the locking of the fluid container 2 is released, the actuating element 6 is operable by the user to establish the locking of the fluid container 2. For example, the actuating element 6 (by means of a control signal), when actuated, causes the control unit 48 to control the electric drive 16 such that the electric drive 16 drives the drive mechanism 51 such that the pressing element 12 is moved to the locked position by the drive mechanism 51. For example, the control unit 48 detects that the pressing element 12 is in the release position and, based on this detection, causes the pressing element 12 to be moved to the locking position when the actuating element 6 is actuated. Exemplarily, the pressing element 12 can be moved alternately into the release position and the locking position by actuating the actuating element 6.

Furthermore, it is possible that actuation of the actuating element 6 in the forward direction (i.e., in the negative x-direction) causes the pressing element 12 to move in the forward direction until the pressing element 12 locks the fluid container 2. For example, after insertion of a partially emptied cartridge, the spindle 18 is moved forward after actuation at the stabilizing handle 5 (e.g., by pushing forward) until the pressing head 42 is force-locked with the cartridge.

Figure 14:
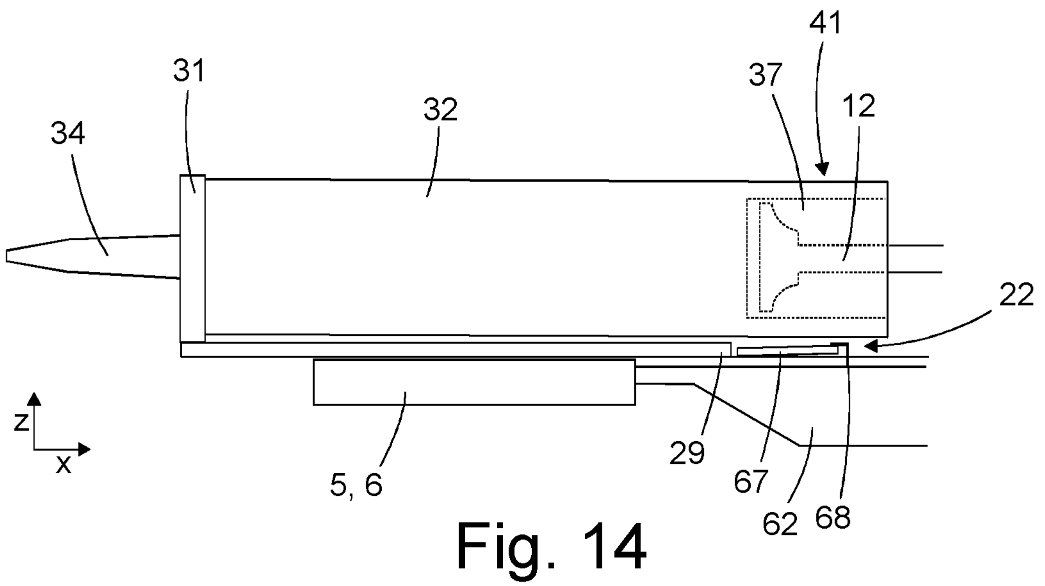
Figure 15:
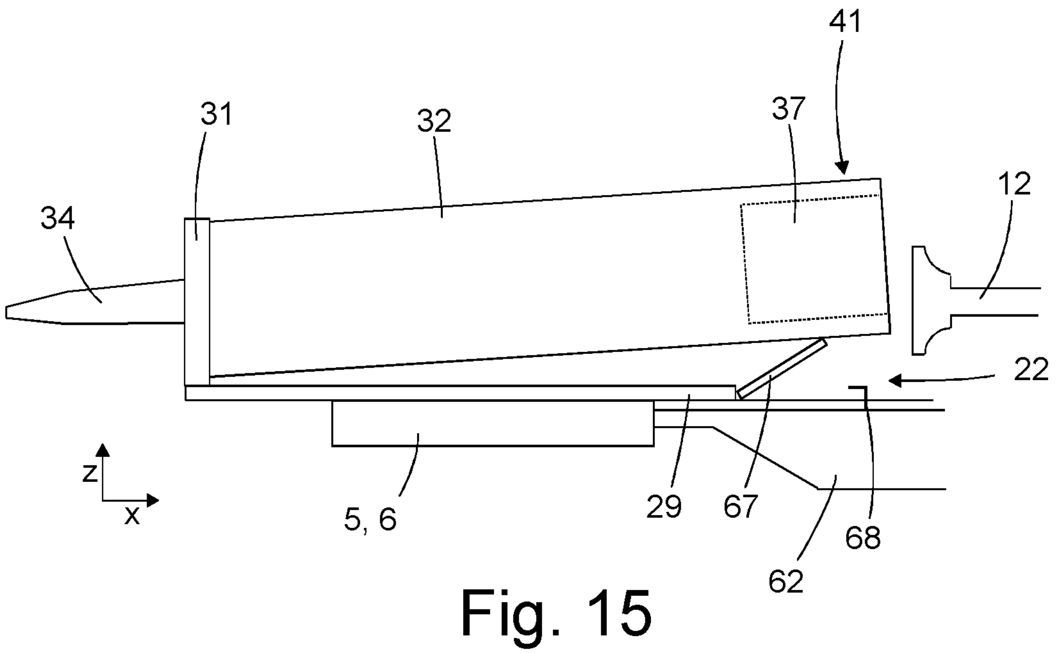

With reference to FIGS. 14 and 15, an optional embodiment will be discussed below in which the fluid container press 10, 20 comprises an erecting mechanism 22. Preferably, the erecting mechanism 22 is triggerable by actuation of the actuating element 6. The erecting mechanism 22 is configured to erect the fluid container 2 relative to the receptacle 1 to facilitate removal of the fluid container 2 from the receptacle 1.

Exemplarily, the erecting mechanism 22 comprises an erecting element 67 which is arranged in particular in or on the receptacle bottom 29, so that the erecting element 67 is located below the inserted fluid container 2. The erecting element 67 is expediently configured to exert an upwardly acting erecting force on the fluid container 2, in particular on the rear body section 41. Exemplarily, the erecting element 67 is designed as a spring element or is spring-loaded via a spring element on the receptacle 1 in order to provide the erecting force as a spring force.

Exemplarily, the erecting mechanism 22 further has a retaining element 68 coupled to the actuating element 6, in particular the stabilizing handle 5, and prevents the erecting element 67 from exerting the erecting force on the fluid container 2 while the actuating element 6 is in the non-actuated position. In an exemplary embodiment, the retaining element 68 is configured as a hook that is coupled to the actuating element 6 via the first coupling section 62 and is thereby moved along with the actuating element 6 in the x-direction. In the non-actuated position of the actuating element 6, the retaining element 68 is engaged with the erecting element 67 so that the erecting element 67 cannot move upward. In the actuated position of the actuating element 6, the retaining element 68 is not engaged with the erecting element 67, so that the retaining element 68 does not prevent the upward movement of the erecting element 67.

Figure 16:
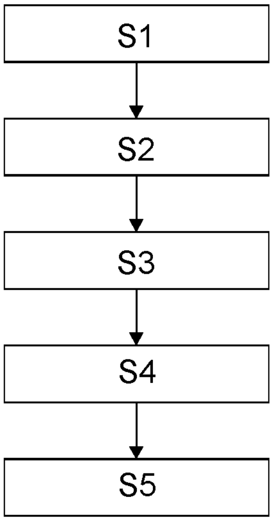

With reference to FIG. 16, a method for operating the fluid container press 10, 20 will be described below. At the beginning of the method, a fluid container 2 is already inserted in the receptacle 1.

The method comprises the first step S1, in which the pressing device 3 is actuated to cause the fluid to be dispensed from the fluid container 2. Exemplarily, at step S1, the operating element 47 is operated to cause the electric drive 16 to provide the input rotary motion based on which the drive element 17 is caused to rotate, thereby causing the spindle 18 to move linearly forward so that the pressing element 12 moves the pressing section 36 in the forward direction (i.e., in the negative x direction) to cause the fluid to be dispensed from the fluid container 2. Expediently, at the first step S1, the user grips the fluid container press 10, 20 with his two hands, namely the carrying handle 4 with his first hand and the stabilizing handle 5 with his second hand. The pressing element 12, in particular the pressing head 42, is located in the receiving space 37 so that the fluid container 2 is locked in the receptacle and cannot be removed.

The method then proceeds to the second step S2, in which the actuating element 6 is actuated to cause a release of the locking of the fluid container 2 by the pressing element 12. Exemplarily, the user moves his second hand, with which he grips the stabilizing handle 5, in the backward direction (i.e., in the positive x direction) to move the stabilizing handle 5 from the non-actuated position to the actuated position. This causes the resetting device 14 to move the pressing element 12 back in the reverse direction, so that the pressing element 12 is no longer in the receiving space 37 and the fluid container 2 is no longer locked in the receptacle by the pressing element 12. Expediently, actuation of the actuating element 6 causes automatic (and in particular complete) movement of the pressing element 12 into the release position.

The method continues with step S3, in which a manual removal of the unlocked fluid container 2 from the receptacle 1 is performed by the user. Between the actuation of the actuating element 6 and the manual removal of the fluid container 2, there is preferably no further action by the user. In particular, the user does not have to manually move the pressing element 12 into the release position.

The method continues with optional step S4, in which the user inserts another fluid container 2 into the receptacle. By means of an operation of the operating element 47 (or, if the fluid container press 10, 20 is so designed, by means of an operation of the actuating element 6), the pressing element 12 is caused to move in the forward direction based on the input rotary motion provided by the electric drive 16, so that the pressing element 12 moves into the receiving space 37 to lock the further fluid container 2 in the receptacle 1 and presses the pressing section 36 in the forward direction to cause the fluid to be discharged from the further fluid container 2.

The user can, for example, create a desired joint with the described fluid container press 10, 20 by dispensing the fluid. When the fluid container 2 is used up or a color change is desired, the user pulls the stabilizing handle 5 (which may also be referred to as the ejector handle) back toward him. This opens the spindle nut 19 (which may also be referred to as spindle coupling) by means of a mechanical linkage. As soon as the spindle coupling is opened, the spindle 18 is returned to the release position with the aid of the spring force of the spring element 15 and the fluid container 2 is released for removal. The user can now remove the fluid container 2 by reaching around it. Conveniently, during the reaching around, the stabilizing handle 5 is simultaneously returned to the non-actuated position with the aid of a spring force (the actuating element return spring) and the spindle coupling is closed. The user can now insert a new fluid container 2 into the fluid container press 10, 20 and continue his work process.

The invention claimed is:

1. A fluid container press comprising a receptacle for a fluid container and a pressing device for pressing the fluid container to effect dispensing of fluid contained in the fluid container, the pressing device further serving to lock the fluid container in the receptacle, so that the fluid container cannot be removed from the receptacle, further comprising a carrying handle with which the fluid container press can be carried and guided by a first hand of a user to position the fluid container press at a desired position when dispensing the fluid, and a stabilizing handle with which the fluid container press can be gripped with a second hand of the user and stabilized during dispensing of the fluid while the user grips the carrying handle with his first hand, wherein the fluid container press comprises an actuating element which is actuable by the user to release the locking of the fluid container in the receptacle, so that the fluid container can be removed from the receptacle, and wherein the stabilizing handle is the actuating element or the actuating element is arranged in the region of the stabilizing handle so that the user can actuate the actuating element with his second hand while the user grips the stabilizing handle with his second hand, wherein the stabilizing handle is the actuating element and the stabilizing handle is displaceable in the longitudinal direction of the fluid container press for actuation.

2. The fluid container press according to claim 1, wherein the stabilizing handle is arranged in the longitudinal direction of the fluid container press between the carrying handle and a front end of the receptacle.

3. The fluid container press according to claim 1, wherein the stabilizing handle is arranged in the longitudinal direction of the fluid container press in the same longitudinal region as the receptacle.

4. The fluid container press according to claim 1, wherein the stabilizing handle is designed as a fore-end handle.

5. The fluid container press according to claim 1, wherein the pressing device comprises a pressing element for pressing and for locking the fluid container, and the fluid container press comprises a resetting device which is adapted, in response to the actuation of the actuating element, to automatically move the pressing element into a release position in which the locking of the fluid container is released.

6. The fluid container press according to claim 5, wherein the resetting device comprises a spring element, the spring force of which serves to move the pressing element into the release position.

7. The fluid container press according to claim 5, wherein the resetting device comprises an electric drive adapted to move the pressing element to the release position.

8. The fluid container press according to claim 5, further comprising a drive element coupled to the pressing element for driving the pressing element, wherein the resetting device is adapted to disengage the coupling between the drive element and the pressing element in response to actuation of the actuating element.

9. The fluid container press according to claim 8, wherein the pressing element comprises a spindle and the drive element comprises a spindle nut with which the spindle is coupled and drivable.

10. The fluid container press according to claim 9, wherein said spindle nut comprises at least one coupling element displaceable, in response to actuation of the actuating element, from a coupling position in which said coupling element is in engagement with a thread of the spindle to an decoupling position in which the coupling element is not in engagement with the thread of said spindle.

11. The fluid container press according to claim 1, wherein, in a state in which the locking of the fluid container is released, the actuating element is operable by the user to establish the locking of the fluid container.

12. The fluid container press according to claim 1, further comprising an erecting mechanism which can be triggered by actuation of the actuating element and is adapted to erect the fluid container relative to the receptacle to facilitate removal of the fluid container from the receptacle.

13. The fluid container press according to claim 1, comprising a screwing and/or drilling device to which the carrying handle belongs, and an attachment device to which the stabilizing handle belongs.

14. The fluid container press according to claim 13, wherein the attachment device is rotatable relative to the screwing and/or drilling device about an axis of rotation aligned parallel to the longitudinal direction of the fluid container press.

15. The fluid container press of claim 1, wherein the fluid container press is a cartridge press and/or a tubular bag press.

16. A method of operating a fluid container press comprising a receptacle, a fluid container arranged in the receptacle, and a pressing device for pressing the fluid container to effect dispensing of fluid contained in the fluid container, the pressing device further serving to lock the fluid container in the receptacle, so that the fluid container cannot be removed from the receptacle, further comprising a carrying handle with which the fluid container press can be carried and guided by a first hand of a user to position the fluid container press at a desired position when dispensing the fluid, and a stabilizing handle with which the fluid container press can be gripped with a second hand of the user and stabilized during dispensing of the fluid while the user grips the carrying handle with his first hand, wherein the fluid container press comprises an actuating element which is actuable by the user to release the locking of the fluid container in the receptacle, so that the fluid container can be removed from the receptacle, and wherein the stabilizing handle is the actuating element or the actuating element is arranged in the region of the stabilizing handle so that the user can actuate the actuating element with his second hand while the user grips the stabilizing handle with his second hand, the method comprising the steps of:

actuating the pressing device to cause dispensing of the fluid from the fluid container, actuating the actuating element to cause unlocking of the fluid container, manually removing the unlocked fluid container from the receptacle, wherein the actuating of the actuating element causes an automatic movement of a pressing element of the pressing device into a release position, so that between the actuating of the actuating element and the manual removing of the fluid container no further action of the user is required in order to be able to remove the fluid container.

17. A fluid container press comprising a receptacle for a fluid container and a pressing device for pressing the fluid container to effect dispensing of fluid contained in the fluid container, the pressing device further serving to lock the fluid container in the receptacle, so that the fluid container cannot be removed from the receptacle, further comprising a carrying handle with which the fluid container press can be carried and guided by a first hand of a user to position the fluid container press at a desired position when dispensing the fluid, and a stabilizing handle with which the fluid container press can be gripped with a second hand of the user and stabilized during dispensing of the fluid while the user grips the carrying handle with his first hand, wherein the fluid container press comprises an actuating element which is actuable by the user to release the locking of the fluid container in the receptacle, so that the fluid container can be removed from the receptacle, and wherein the stabilizing handle is the actuating element or the actuating element is arranged in the region of the stabilizing handle so that the user can actuate the actuating element with his second hand while the user grips the stabilizing handle with his second hand, wherein the pressing device comprises a pressing element for pressing and for locking the fluid container, and the fluid container press comprises a resetting device which is adapted, in response to the actuation of the actuating element, to automatically move the pressing element into a release position in which the locking of the fluid container is released.

* * * * *